(12) United States Patent
Fong

(10) Patent No.: US 7,273,305 B2
(45) Date of Patent: Sep. 25, 2007

(54) VISUAL DISPLAY DEVICE

(75) Inventor: Ching Fong, Canton, MI (US)

(73) Assignee: Collins & Aikman Development Company, Southfield, MI (US)

( * ) Notice: Subject to any disclaimer, the term of this patent is extended or adjusted under 35 U.S.C. 154(b) by 0 days.

(21) Appl. No.: 10/363,772

(22) PCT Filed: Sep. 6, 2001

(86) PCT No.: PCT/US01/27617

§ 371 (c)(1),
(2), (4) Date: Oct. 14, 2003

(87) PCT Pub. No.: WO02/21490

PCT Pub. Date: Mar. 14, 2002

(65) Prior Publication Data

US 2004/0047160 A1    Mar. 11, 2004

(51) Int. Cl.
*F21V 5/00* (2006.01)
(52) U.S. Cl. .............. 362/520; 362/516; 362/540; 362/327; 362/348
(58) Field of Classification Search .............. 362/26, 362/27, 29–31, 555, 540–545, 560, 511, 516, 362/518, 520, 327–329, 334–337, 347, 348, 362/487
See application file for complete search history.

(56) References Cited

U.S. PATENT DOCUMENTS

| | | | |
|---|---|---|---|
| 2,181,725 A * | 11/1939 | Eckel ............... 359/547 |
| 2,254,962 A * | 9/1941 | Bitner et al. ............... 362/327 |
| 4,733,335 A * | 3/1988 | Serizawa et al. ............... 362/503 |
| 5,165,772 A | 11/1992 | Wu ............... 362/26 |
| 5,227,773 A | 7/1993 | Wu et al. ............... 340/815.07 |
| 5,890,796 A | 4/1999 | Marinelli et al. |
| 6,305,813 B1 | 10/2001 | Lekson et al. ............... 362/31 |
| 6,474,845 B1 * | 11/2002 | Mabe et al. ............... 362/296 |

OTHER PUBLICATIONS

Supplementary European search report dated Apr. 13, 2007; issued in the counterpart European Patent Application No. 01968536.5 filed on Mar. 14, 2003.

* cited by examiner

*Primary Examiner*—Sandra O'Shea
*Assistant Examiner*—Bao Q. Truong
(74) *Attorney, Agent, or Firm*—Grossman, Tucker, Perreault & Pfleger PLLC

(57) ABSTRACT

A lighting device especially suitable for automotive center-high-mounted-stop-light (CHMSL) and brake light applications is provided. The lighting device comprises a display panel having at least two interfaces therein, with at least one interface configured as a light reflective interface and at least one interface configured as a light emitting interface. At least a portion of light from a light source propagates through the display panel into contact with the light reflective interface and is reflected by the light reflective interface towards the light emitting interface using total internal reflection.

13 Claims, 2 Drawing Sheets

VISUAL DISPLAY DEVICE

CROSS REFERENCE TO RELATED APPLICATIONS

This application is the National Stage of International Application No. PCT/US01/27617 filed Sep. 6, 2001 and published Mar. 14, 2002 as International Publication No. WO 02/21490, designating the United States, and which claims priority of U.S. patent application Ser. No. 09/658,583 filed Sep. 8, 2000, now abandoned.

TECHNICAL FIELD OF THE INVENTION

The present invention generally relates to visual displays and, more specifically, to a visual display device which is especially suitable for automotive center-high-mounted-stop-light (CHMSL) and brake light applications.

BACKGROUND OF THE INVENTION

Red colored CHMSLs for motor vehicles function as a third brake light (in addition to conventional right-hand and left-hand mounted red-colored brake lights) and are typically mounted adjacent the vehicle rear window. Depression of the vehicle brake pedal causes the CHMSL to be illuminated in combination with the two low mounted brake lights to form a triangle pattern with greatly enhanced visibility and ability to immediately attract the attention of the operator of a trailing vehicle.

One problem which has persisted in providing CHMSLs and other lighting devices on motor vehicles is that existing devices generally include a housing in combination with a separately affixed translucent lens. The housing itself is often a relatively complex plastic molding and generally further includes a coating applied to the interior surfaces thereof to function as a reflector. Generally a white incandescent illuminating bulb is located inside the housing which is wired to the vehicle's lighting circuit. The combination of elements is expensive and inefficient. Further, the joining of the housing and lens in the most efficient manner to achieve a water-tight seal which does not leak pursuant to automotive specifications has eluded designers and engineers as evident from the number of issued patents involving such structures.

Furthermore, conventional CHMSLs and brake lights using an incandescent bulb in a housing in combination with a separately affixed translucent lens have a low lighting efficiency, a relatively short lifetime, and generate heat. In order to overcome some of the above problems, light emitting diodes (LEDs) have replaced incandescent bulbs in some CHMSL applications. However, the CHMSLs incorporating LEDs to date have had little or no optical design to meet photometric requirements, as the designers have relied on the directional nature of a LED to meet such requirements. However, in relying on the directional nature of a LED to meet photometric requirements without any optical design, such CHMSLs must use a greater number of LEDs in order to meet photometric requirements than would lee necessary had an optical design been utilized. In this manner, CHMSLs incorporating LEDs to date have also been inefficient.

In light of the deficiencies of the art, what is needed is a visual display device, such as a motor vehicle lighting device and more particularly a CHMSL, which offers a more simplistic structure such that a housing and lens do not have to be separately formed. Furthermore, what is needed is a visual display device wherein the housing and lens do not have to be affixed or otherwise assembled to one another. Furthermore, what is needed is a visual display device which will not leak water between the housing and the lens. Furthermore, what is needed is a visual display device housing which does not require a separately applied reflective coating. Furthermore, what is needed is a visual display device which has a high light collection efficiency.

SUMMARY OF THE INVENTION

A visual display device embodying the present invention is especially suitable for automotive lighting applications, particularly brake lights and more particularly a center-high-mounted-stop-light (CHMSL).

The visual display device of the present invention is simple in structure and highly efficient. The visual display device of the present invention offers a simple structure such that a housing and lens do not have to be separately formed. Furthermore, the visual display device of the present invention offers a simple structure such that a housing and a lens do not have to be affixed or otherwise assembled to one another. Furthermore, the visual display device of the present invention offers a simple structure which will not leak water between a housing and a lens. Furthermore, the visual display device of the present invention offers a simple structure such that a housing does not require a separately applied reflective coating. Furthermore, the visual display device of the present invention offers a simple structure which has a high light collection efficiency.

The visual display device of the present invention comprises a display panel. The display panel is made of a light transmissive material and contains a light reflective interface therein and a light emitting interface therein, preferably all of unitary construction. Consequently, the formation of a separate housing and lens typical of the prior art is eliminated, as well as having to affix or otherwise assemble them to one another, in light of the present invention's unitary construction. Furthermore, there is no opportunity for water to leak between a housing and lens typical of the prior art because, in light of the present invention's unitary construction, there is no air space therebetween.

The display panel of the present invention also makes use of total internal reflection. Consequently, high light collection efficiency may be obtained and there is no need for a separately applied reflective coating to be applied thereto.

These and other features and advantages of the present invention will be apparent to those skilled in the art from the following detailed description, taken together with the accompanying drawings, in which like reference numerals refer to like parts.

BRIEF DESCRIPTION OF THE DRAWINGS

To better understand and appreciate the invention, refer to the following detailed description in connection with the accompanying drawings.

DETAILED DESCRIPTION OF THE INVENTION

Figure 1:
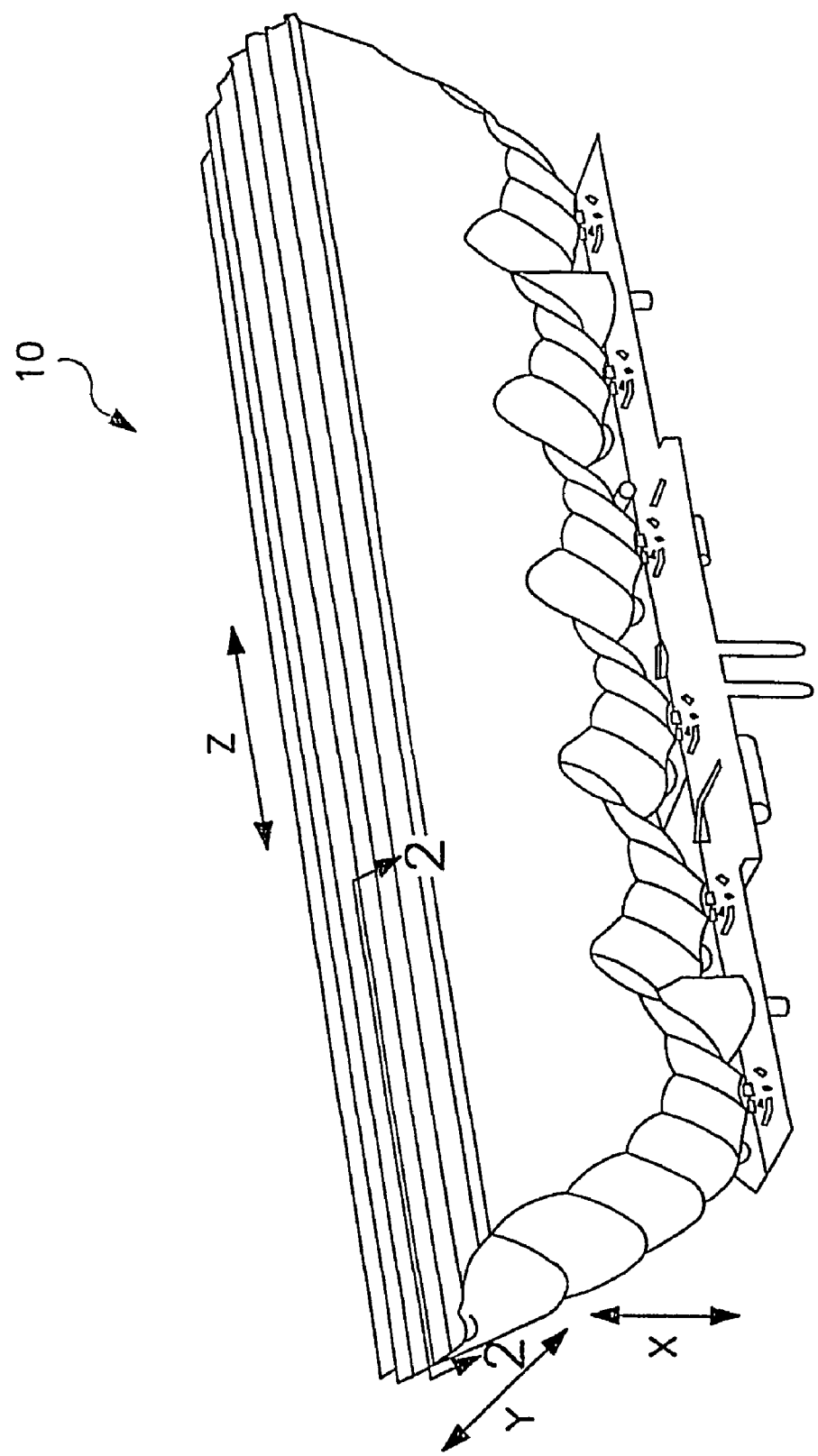
FIG. 1 is a perspective view of the visual display device according to the present invention.
Figure 2:
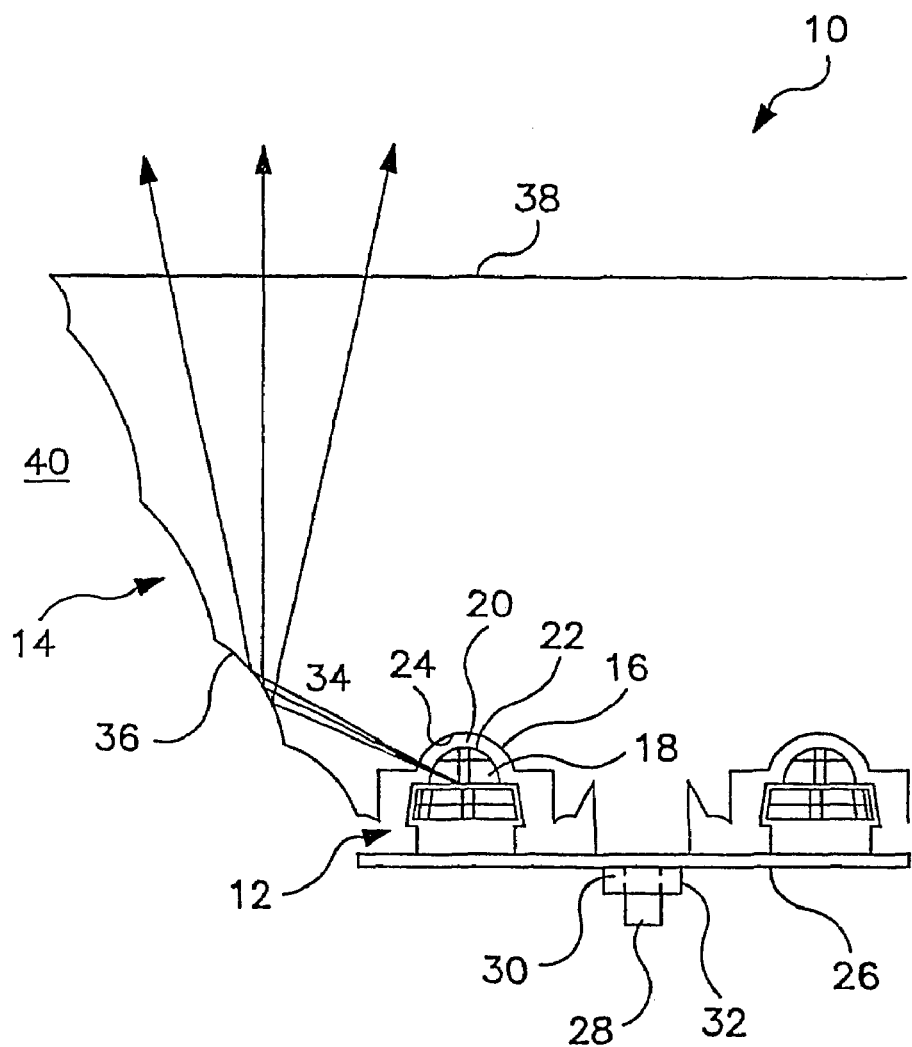
FIG. 2 is a partial cross-sectional view of the visual display of FIG. 1 taken along line 2-2.

FIGS. 1 and 2 illustrate a visual display device 10 which may be advantageously employed as a stop (i.e. brake) light, particularly a CHMSL. The visual display device 10 includes at least one light source 12 and a display panel 14. The display panel 14 is made of a light transmissive material, such as glass or plastic (e.g. acrylic, polycarbonate, polystyrene), which is preferably transparent and uncolored. Further illustrated in FIG. 1 are orthogonal X-, Y- and Z-axes or directions which are indicated by arrows and lines respectively.

Preferably, the light source 12 comprises light emitting diode (LED) module. More preferably, light source 12 comprises at least one light emitting diode module and more preferably a plurality of light emitting diode modules. Even more preferably, the light emitting diode modules are of the SNAPLED® brand from Hewlett Packard Company, 3000 Hanover Street, Palo Alto, Calif., 94304.

When the display device 10 is used as a CHMSL, the light source 12 preferably emits red light when used in combination with a transparent and uncolored display panel 14. However, in other embodiments, the light source 12 may emit white light or colors other than red. For example, the light source 12 may emit white light when used in combination with a transparent red display panel 14.

Display panel 14 preferably comprises at least one light source receptacle 16 into which at least a portion of light source 12 may be inserted. More preferably display panel 14 comprises a plurality of light source receptacles 16 into which a plurality of light sources 12 may be inserted and more preferably the number of light source receptacles 16 is equal to the number of light sources 12.

Preferably the light emitting element 18 of the light source 12 is not in direct contact with the display panel 14 when properly inserted in light source receptacle 16. In other words, as shown FIG. 2, preferably an air space 20 exists between the outer surface 22 of the light emitting element 18 and the inner surface 24 of the light source receptacle 16.

Preferably the light source 12 is attached to the display panel 14 by an appropriate fastener device. Where a plurality of light sources 12 are used, preferably multiple light sources 12 are first connected to at least one carrier 26 in order to simplify attachment of the light sources 12 to the display panel 14. Preferably, the light sources 12 are connected to the carrier 16 by mechanical fastening devices (e.g. clips, snaps, snap-tabs, crimping, etc.)

After the light sources 12 are connected to the carrier 26, the carrier 26 is then preferably connected to the display panel 14. In order to facilitate attachment of the carrier 26 to the display panel 14, preferably the display panel 14 comprises at least one (and more preferably at least two) post or shaft elements 28, preferably formed unitary therewith, while carrier 26 comprises at least one (and more preferably at least two) aperture elements 30. Upon assembly, preferably shaft 28 of display panel 14 extends through aperture 30 of carrier 26. Subsequent to shaft 28 extending through aperture 30, the shaft 28 may be heat staked or a nut 32 may be placed thereon to secure the carrier 26 to the display panel 14.

In addition to providing a structure for fastening light sources 12 to display panel 14, carrier 26 may also comprise one or more electrical connections which connect the light sources 12 to a power source.

In order to achieve high light collection efficiencies not presently achieved 8 with the use of LEDs in CHMSL applications, the display panel 14 of visual display device 10 employs total internal reflection (TIR). Simply stated, total internal reflection occurs where light, in the presence of two mediums with different indexes of refraction, is reflected rather than refracted.

As light passes from one medium with a first index or refraction to a second medium with a different index of refraction, it is refracted. If light passes from a medium with a lower index of refraction to one with a higher index of refraction, the light is refracted toward the normal. Conversely, if the light passes from a higher to a lower index of refraction, the light is refracted away from the normal. Snell's Law determines the amount the light is refracted by the equation $n_1 \sin\theta_1 = n_2 \sin\theta_2$ where $n_1$=index of refraction of the first medium and $n_2$=index of refraction of the second medium.

With Shell's Law, as the angle of incidence $\theta_1$ increases, the angle of refraction approaches 90°. The angle of incidence $\theta_1$ that produces an angle of refraction $\theta_R$ of 90° is the critical angle $\theta_C$ which may be determined by the equation $$\theta_C = \sin^{-1}(n_2/n_1).$$

Increasing the angle of incidence $\theta_1$ to greater than the critical angle $\theta_C$ results in total internal reflection. When total internal reflection occurs, the angle of incidence $\theta_I$ is equal to the angle of reflection $\theta_F$.

In light of Snell's Law, an "interface" exists where light may propagate from one medium with a first index of refraction into a second medium with a second index of refraction. In the case of the CHMSL of the present invention, as shown in FIG. 2 an exemplary "interface" portion identified at 36 exists at the perimeter edge of display panel 14 where light 34 may propagate from the confines of the display panel 14 (with a first index of refraction) into air 40 (with a second index of refraction) surrounding the display panel 14. Preferably, as shown, interface 36 is unitary with the display panel 14. In other words, interface 36 is formed at the same time and from the same material as the display panel.

Upon use of the CHMSL, at least a portion of the light 34 from the light source 12 propagates from the light source 12 through a portion of the display panel 14 towards interface 36. In employing total internal reflection, the angle of incidence $\theta_I$ of the portion of light 34 from light source 12 incident on (i.e. contacting) interface 36 is greater than the critical angle $\theta_C$ stemming from the differences in indexes of refraction between the two mediums (i.e. display panel 14 and air 40). Consequently, the portion of light 34 from light source 12 incident on interface 36 does not propagate through the interface 36 where it is inefficiently lost, but rather is reflected and "collected" using total internal reflection within the display panel 14 where it continues to be contained for subsequent beneficial use. Consequently, interface 36 can be referred to as a "reflective" interface.

Subsequent to reflection by interface 36, the portion of light 34 from light source 12 incident on interface 36 continues to propagate through the display panel 14 and is directed towards or otherwise convergent on a second display panel 14/air 40 interface identified at 38. However, unlike interface 36 which is reflective, interface 38 is refractive. In other words, light 34 incident on interface 38 passes through the interface 38, albeit refracted. In this manner interface 38 functions as a light emitting interface for display panel 14.

More preferably, interface 38 is configured to take on the characteristics of a lens and is presented or mounted in the vehicle in such a manner as to be a visible target surface for the transmission of light 34 to trailing motorists or other perceivers of the light 34. Conversely, the surface area of the display panel 14 not comprising the visible target surface of the display panel 14 comprises a non-target surface (in other words, for example, at interface 36). Preferably, as shown, interface 38 is unitary with the display panel 14. In other words, interface 38 is formed at the same time and from the same material as the display panel.

With regards to the high light collection efficiency of display panel 14, the higher the amount of light 34 from light source 12 propagating into the display panel 14 and subsequently emitting from the light emitting interface 38 the better. Preferably at least 50% (i.e. 50% to 100%) of the light 34 from light source 12 propagating into the display panel 14 emits from the light emitting interface 38. In the preferred range of 50% to 100%, it is further understood that the range may be sub-divided into any percentage increment or range between 50% and 100% (e.g. 50%, 75%, 80%, 85%, 90%, 95%, 96%, 97%, 98%, 99%, 100%).

Also with regards to the high light collection efficiency of display panel 14, preferably at least 50% (i.e. 50% to 100%) of the surface area of the display panel 14 not configured as a light emitting interface 38 and having light 34 incident thereon, reflects light 34 and converges it towards the light emitting interface 38 using total internal reflection. In light of the preferred range of 50% to 100%, it is further understood that the range may be sub-divided into any percentage increment or range between 50% and 100% (e.g. 50%, 75%, 80%, 85%, 90%, 95%, 96%, 97%, 98%, 99%, 100%).

With respect to using total internal reflection, preferably it least a portion of the surface area of the display panel 14 not configured as a light emitting interface 38, particularly the surface area adjacent and surrounding the light source 12, exhibits a overall concave shape with respect to the light 34 provided by light source 12 (i.e. to an observer of the display panel 14, the concave shape with respect to the light appears as a convex shape with respect to the observer).

Also with respect to total internal reflection, preferably the overall concave shape of the display panel 14 respect to the light 34 provided by light source 12 comprises a plurality of convex features (i.e. to an observer of the display panel 14, the convex features appear as concave features).

We intend the above description to illustrate embodiments of the present invention by using descriptive rather than limiting words. Obviously, there are many ways that one might modify these embodiments while remaining within the scope of the claims. In other words, there are many other ways that one mall practice the present invention without exceeding the scope of the claims herein.

I claim:

1. A lighting device for a motor vehicle comprising:
   at least one light source providing light;
   a display panel of unitary construction having a surface area and comprising at least two interfaces therein, at least one interface configured as a light reflective interface and at least one interface configured as a light emitting interface including a receptacle for said light source and wherein said light source is not in direct contact with said display panel;
   wherein at least a portion of the surface area of the display panel not configured as a light emitting interface and surrounding the light source exhibits an overall concave shape with respect to the light source;
   wherein at least a portion of the light from the light source propagates through the display panel into contact with the light reflective interface and is reflected by the light reflective interface towards the light emitting interface;
   wherein the light reflective interface comprises a plurality of convex features with respect to the light; and
   wherein an air space exists between the light source and the display panel.

2. The lighting device for a motor vehicle of claim 1 wherein the light reflected by the light reflective interface towards the light emitting interface occurs using total internal reflection.

3. The lighting device for a motor vehicle of claim 1 wherein the lighting device comprises a center high mounted stop light.

4. The lighting device for a motor vehicle of claim 1 wherein the light reflective interface is unitary with the display panel.

5. The lighting device for a motor vehicle of claim 1 wherein the light emitting interface is unitary with the display panel.

6. The lighting device for a motor vehicle of claim 1 wherein the display panel comprises plastic.

7. The lighting device for a motor vehicle of claim 1 wherein the display panel comprises glass.

8. The lighting device for a motor vehicle of claim 1 wherein the display panel is uncolored.

9. The lighting device for a motor vehicle of claim 1 wherein the display panel is transparent.

10. The lighting device for a motor vehicle of claim 1 wherein the light source comprises at least one light emitting diode.

11. The lighting device for a motor vehicle of claim 1 wherein the light comprises white light or red light.

12. The lighting device for a motor vehicle of claim 1 wherein the light source is attached to a carrier and the carrier is attached to the display panel.

13. The lighting device for a motor vehicle of claim 1 wherein at least 50% of the light from the light source propagating into the display panel emits from the light emitting interface.

* * * * *